United States Patent
Wu et al.

(10) Patent No.: US 10,277,348 B2
(45) Date of Patent: Apr. 30, 2019

(54) METHOD AND DEVICE FOR PERFORMING INTERFERENCE COORDINATION IN WIRELESS COMMUNICATION SYSTEM

(71) Applicant: Sony Corporation, Tokyo (JP)

(72) Inventors: Liang Wu, Nanjing (CN); Zaichen Zhang, Nanjing (CN); Jian Dang, Nanjing (CN); Yingying Yu, Nanjing (CN); Weiwei Qin, Nanjing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/560,186

(22) PCT Filed: Mar. 16, 2016

(86) PCT No.: PCT/CN2016/076486
§ 371 (c)(1),
(2) Date: Sep. 21, 2017

(87) PCT Pub. No.: WO2016/155502
PCT Pub. Date: Oct. 6, 2016

(65) Prior Publication Data
US 2018/0097576 A1    Apr. 5, 2018

(30) Foreign Application Priority Data

Apr. 3, 2015  (CN) .......................... 2015 1 0158793

(51) Int. Cl.
*H04J 11/00*    (2006.01)
*H04B 7/06*    (2006.01)
(Continued)

(52) U.S. Cl.
CPC .......... *H04J 11/0036* (2013.01); *H04B 7/024* (2013.01); *H04B 7/0634* (2013.01);
(Continued)

(58) Field of Classification Search
CPC .... H04B 7/0634; H04J 11/0036; H04L 5/001; H04W 24/02; H04W 72/082
(Continued)

(56) References Cited

U.S. PATENT DOCUMENTS 6,795,409 B1 *  9/2004  Youssefmir .......... H04B 7/0617
                                              370/277
7,876,715 B1 *  1/2011  Jin ....................... H04B 7/0452
                                              342/372
(Continued)

FOREIGN PATENT DOCUMENTS

CN    103402206 A    11/2013
CN    103444251 A    12/2013
(Continued)

OTHER PUBLICATIONS

International Search Report dated Jun. 7, 2016 in PCT/CN2016/076486 filed Mar. 16, 2016.

*Primary Examiner* — Tan H Trinh
(74) *Attorney, Agent, or Firm* — Xsensus LLP

(57) ABSTRACT

The present invention provides a method and device for performing interference coordination in a wireless communication system. The wireless communication system comprises a plurality of user terminals. The method comprises: determining, according information acquired from user terminals, arrival angles of signals sent by the user terminals; and selecting a user terminal that needs a service according to the arrival angles of the signals sent by the user terminals.

18 Claims, 9 Drawing Sheets

(51) Int. Cl.
  *H04W 72/08* (2009.01)
  *H04W 88/08* (2009.01)
  *H04B 7/024* (2017.01)
  *H04W 36/20* (2009.01)
  *H04L 5/00* (2006.01)
  *H04W 24/02* (2009.01)
  *H04W 36/16* (2009.01)

(52) U.S. Cl.
  CPC ......... *H04W 36/20* (2013.01); *H04W 72/082* (2013.01); *H04W 88/08* (2013.01); *H04L 5/001* (2013.01); *H04W 24/02* (2013.01); *H04W 36/165* (2013.01)

(58) Field of Classification Search
  USPC ........... 455/69, 522, 456.1, 101, 562.1, 501, 455/67.11, 509; 370/252, 312, 329, 330, 370/338; 342/372
  See application file for complete search history.

(56) References Cited

U.S. PATENT DOCUMENTS

| | | | | |
|---|---|---|---|---|
| 8,200,263 | B2* | 6/2012 | Wei | H04W 72/082 455/501 |
| 8,681,048 | B2* | 3/2014 | Nishida | G01S 1/10 342/367 |
| 8,837,407 | B2* | 9/2014 | Guo | H04B 7/0408 370/329 |
| 9,179,471 | B2 | 11/2015 | Zhu et al. | |
| 9,413,474 | B2* | 8/2016 | Chai | H04B 17/104 |
| 9,445,282 | B2* | 9/2016 | Chen | H04B 7/0695 |
| 2003/0012265 | A1* | 1/2003 | Lin | H04B 7/086 375/148 |
| 2003/0069047 | A1* | 4/2003 | Kitahara | H04B 7/0617 455/562.1 |
| 2004/0005897 | A1* | 1/2004 | Tomoe | H04W 16/32 455/450 |
| 2004/0009755 | A1* | 1/2004 | Yoshida | H01Q 1/246 455/101 |
| 2007/0054623 | A1* | 3/2007 | Sato | H04B 7/0617 455/67.11 |
| 2009/0323577 | A1* | 12/2009 | Agrawal | H04L 1/0026 370/312 |
| 2011/0103254 | A1* | 5/2011 | Guo | H04B 7/0408 370/252 |
| 2011/0207494 | A1* | 8/2011 | Zhu | H04B 7/024 455/509 |
| 2011/0319118 | A1* | 12/2011 | Yu | H04W 52/40 455/522 |
| 2012/0128089 | A1* | 5/2012 | Tsutsui | H04B 7/0617 375/267 |
| 2012/0165037 | A1* | 6/2012 | Bull | G01S 5/0205 455/456.1 |
| 2013/0023285 | A1 | 1/2013 | Markhovsky et al. | |
| 2013/0070741 | A1* | 3/2013 | Li | H04W 72/046 370/338 |
| 2014/0056282 | A1* | 2/2014 | Sun | H04W 52/143 370/330 |
| 2014/0064247 | A1* | 3/2014 | Teyeb | H04W 36/0083 370/331 |
| 2016/0014791 | A1 | 1/2016 | Liu et al. | |
| 2017/0055281 | A1* | 2/2017 | Islam | H04W 72/0446 |
| 2017/0181010 | A1* | 6/2017 | Burgess | H04W 16/28 |

FOREIGN PATENT DOCUMENTS

CN  104040367 A  9/2014
WO  2014/139112 A1  9/2014

* cited by examiner served user link
interference user link served user link
interference user link

METHOD AND DEVICE FOR PERFORMING INTERFERENCE COORDINATION IN WIRELESS COMMUNICATION SYSTEM

FIELD

The disclosure relates to a method and a device for performing interference coordination in a wireless communication system, and particularly to a method and a device for estimating arrival angles of signals transmitted by user terminals and performing interference coordination based on the arrival angles.

BACKGROUND

In order to adapt to the rapid growth of mobile data traffic, the deployment of small base stations is the trend of wireless communication development. Small base station facilitates managing and using existing wireless spectrum resources more efficiently. As compared with the macro base station, the small base station has smaller coverage, higher space utilization of the spectrum, and more flexible layout. There may be a number of small cells served by small base stations within the coverage of each macro base station in the future.

With the increase of the number of small base stations, in the coverage of a specific small base station, there may be not only multiple served users, but also multiple interference users which are not served by the small base station. Interference users may be the users served by other small base stations, or may be the users served by a macro base station. If all users within the coverage of a small base station are divided into a served user set and an interference user set, each set may include multiple users. The interference user set is a set of which signals need to be suppressed, while the served user set is a set of which signals are to be maintained. It is desired to implement multi-user communication without mutual interferences in the served user set. Therefore, interference coordination between small base stations and between the small base station and the macro base station has extremely important impact on the management of the entire wireless network.

Interference coordination technology mainly aims to minimize the interference between neighboring cells by coordinating different base stations to use different communication resources. The existing technology mainly considers the following three aspects: frequency domain, time domain and power control. From the frequency domain perspective, the cells that are adjacent to each other use spectral resources orthogonal to one another, and different frequency sets are allocated to the user located in the center of the cell and the user located at the edge of the cell, thereby improving the communication performance of the use located at the edge of the cell, or orthogonal subcarrier resources are reasonably reused on the basis of the orthogonal modulation technique. From the time domain perspective, sub-frame management is mainly performed, such that the interference users have limited load or even no load in some sub-frames, thereby ensuring the reliable communication of the served users in these sub-frames. The power control technology improves the communication quality by sacrificing a part of the throughput, for example by reducing the transmission power of the interference base station to ensure the communication performance of the interfered user. These three aspects of the technology facilitate reducing the interference, but to some extent at the expense of other aspects of the system performance.

On the other hand, the smart antenna system is dedicated to the development of space resources. By deploying the antenna array, the pattern of the array can be changed by adjusting weighting coefficients of respective elements so that the beam always points to the DOA (Direction of Arrival) of the user's signal, with the zero point being aligned with the interference signal, such that the beam automatically follows the user's signal. This technology can improve the gain and signal-to-noise ratio of the antenna, such that the number of the users can be increased under the condition of same frequency domain, same time slot and same code. It is an effective way to solve the shortage of resources in current frequency domain and to improve the communication capacity. The conventional arrival angle estimation techniques include subspace-based arrival angle estimation algorithms. Typical algorithms may include, for example, MUSIC and ESPRIT. However, these algorithms can estimate only the arrival angle of all signals arriving at the antenna array, but cannot obtain the arrival angle corresponding to the signal of each specific user terminal. Therefore, the interference to other user terminals cannot be avoided when the base station performs downlink transmission.

Therefore, the future wireless communication system in which a large number of small base stations are deployed puts forward the requirements of interference coordination and multi-user communication in a multi-cell multi-user multi-interference environment.

SUMMARY

According to an aspect of the present disclosure, it is provided a method for performing interference coordination in a communication system comprising a plurality of user terminals. The method includes: determining arrival angles of signals transmitted by the user terminals based on information obtained from the user terminals; and selecting the user terminals to be served based on the arrival angles of the signals of the user terminals.

According to another aspect of the present disclosure, it is provided a method for receiving a signal in an uplink on base station side, comprising: determining the arrival angle of the signal of each of the served terminals and the interference terminals within a coverage of the base station; initially restoring, in a smart antenna layer, the signal of the served terminal based on the arrival angle of the signal of the served terminal; and further restoring, in a multiple-input multiple-output (MIMO) layer, the signal of the served terminal based on the initially restored signal.

According to another aspect of the present disclosure, it is provided a method for transmitting a signal in a downlink on base station side, comprising: determining the arrival angle of the signal of each of the served terminals and the interference terminals within the coverage of the base station; determining transmission weight vector for the served terminal based on the determined arrival angle of the signal of the served terminal; and transmitting a signal for the served terminal by weighting the signal for the served terminal by the determined transmission weight vector.

According to another aspect of the present disclosure, it is provided a base station in a communication system which comprises a plurality of user terminals, the base station comprising one or more processors configured to: determine arrival angles of signals transmitted by the user terminals based on information obtained from the user terminals; and select the user terminals to be served based on the arrival angles of the signals of the user terminals.

The one or more processors may be further configured to: initially restore, in a smart antenna layer, the signal of the served terminal based on the arrival angle of the signal of the served terminal; and further restore, in a multiple-input multiple-output (MIMO) layer, the signal of the served terminal based on the initially restored signal.

The one or more processors may be further configured to: determine transmission weight vector for the served terminal based on the determined arrival angle of the signal of the served terminal; and weight a signal for the served terminal by the determined transmission weight vector.

BRIEF DESCRIPTION OF THE DRAWINGS

The present disclosure may be better understood by referring to the following description given in conjunction with the drawings, the same or similar reference numbers are used in all the drawings to represent the same or similar components. The drawings and the detailed description below, which are incorporated in the specification and constitute a part of the specification, are used to further describe preferred embodiments of the present disclosure and explain the principle and advantages of the present disclosure. In the drawings:

FIG. 6 schematically illustrates processing of the smart antenna layer and the

Figure 7:
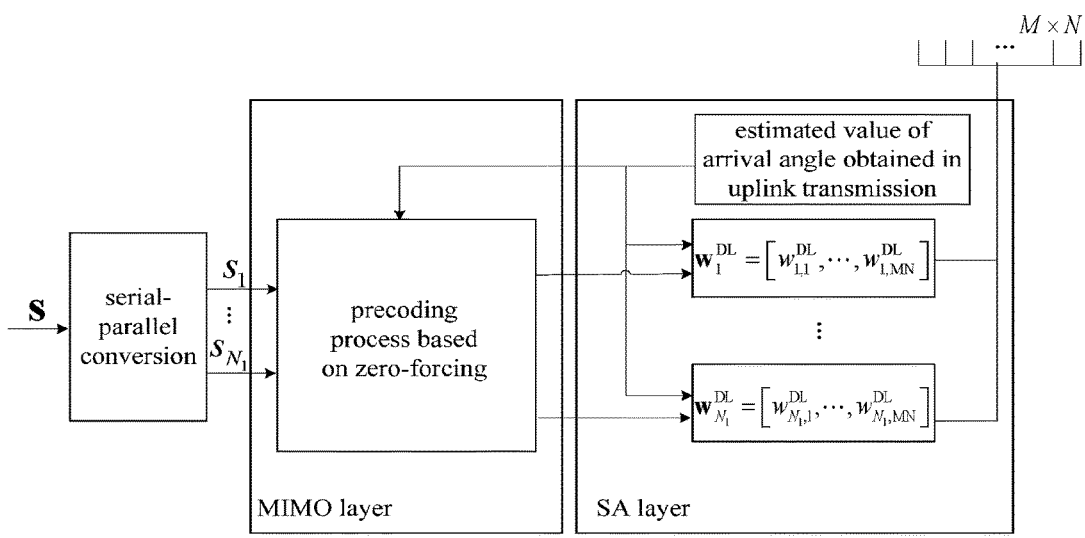
Figure 8:
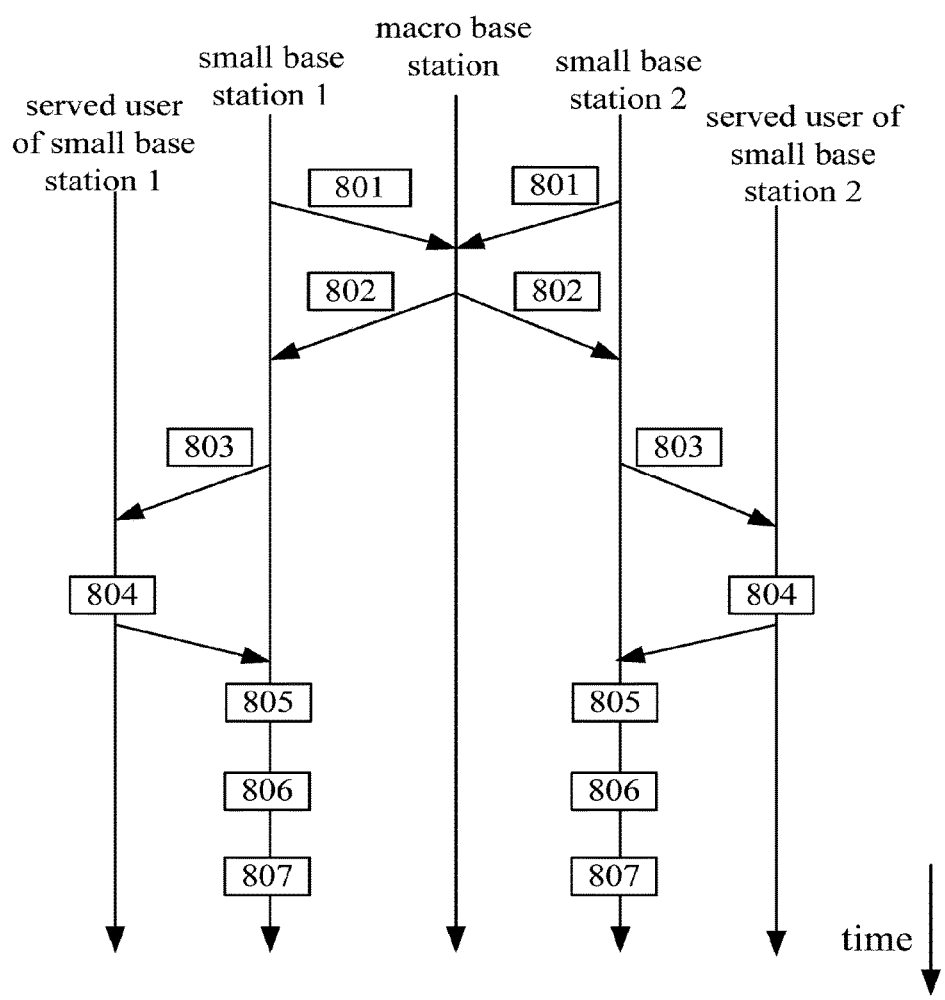
Figure 9:
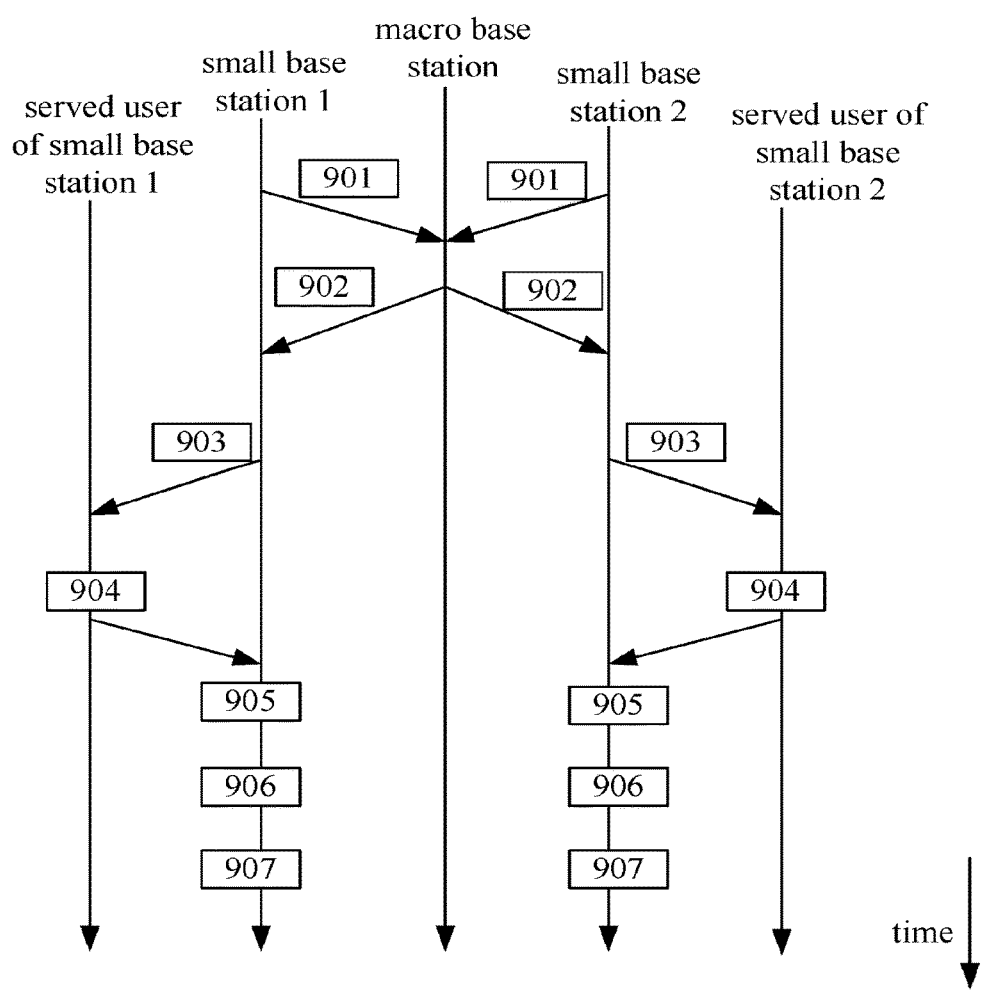
Figure 10:
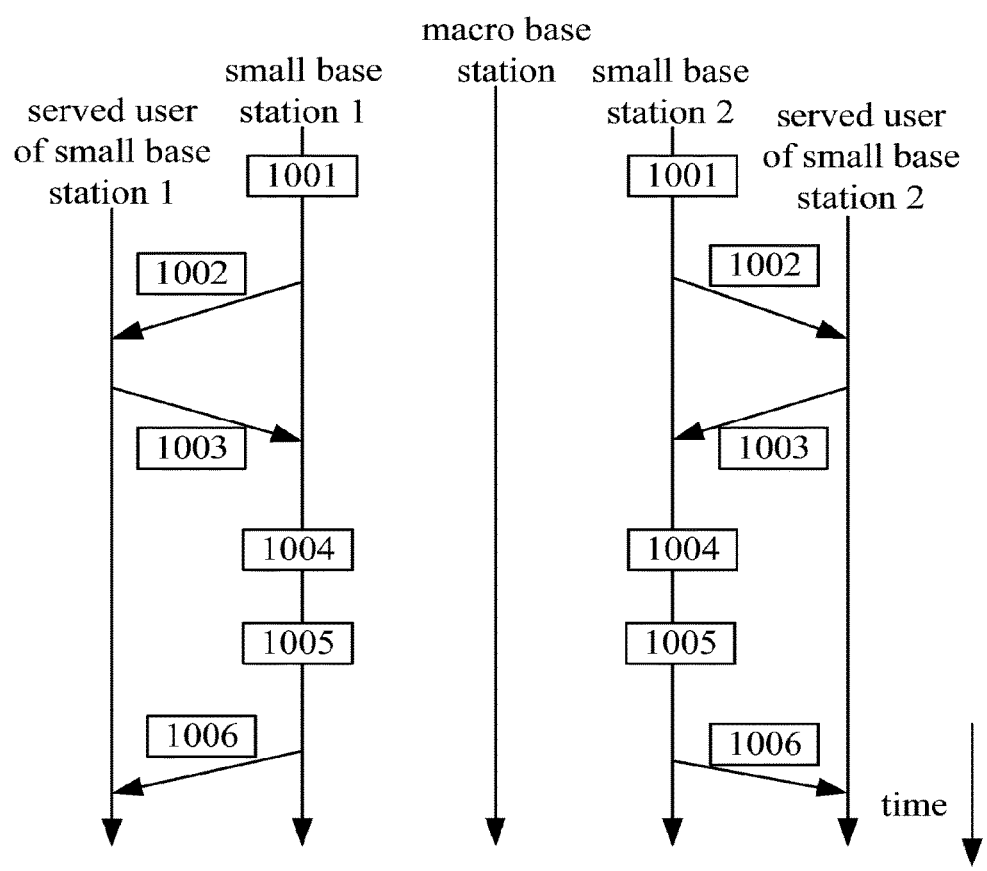
Figure 11:
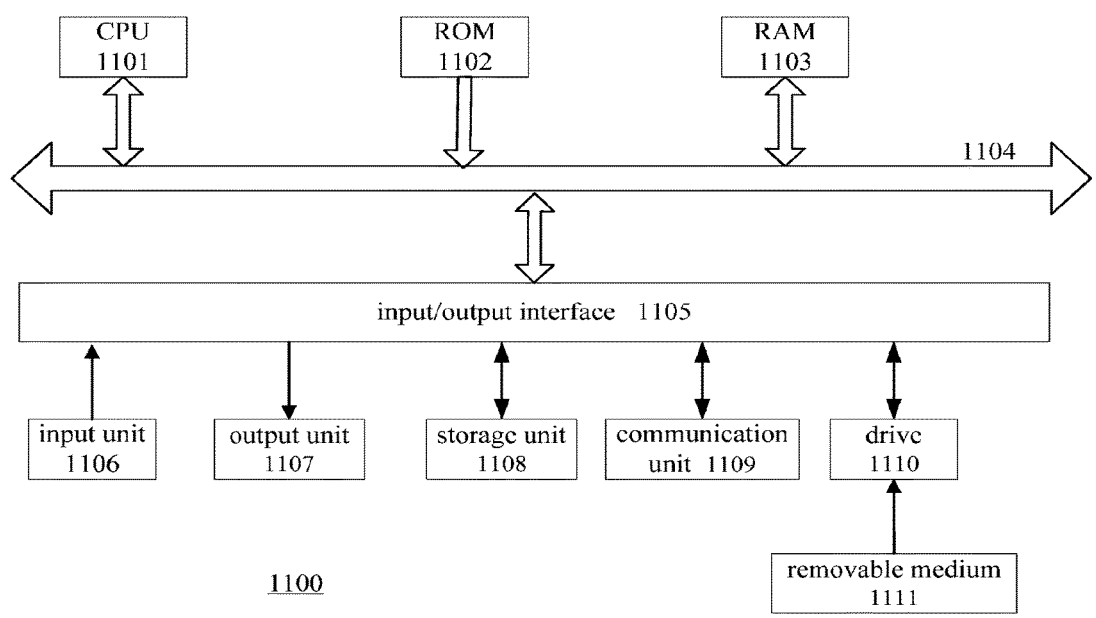

MIMO layer in uplink transmission;

FIG. 7 schematically illustrates the processing of the smart antenna layer and the MIMO layer in downlink transmission;

FIG. 8 illustrates a signaling interaction flow of uplink transmission according to an embodiment of the present disclosure;

FIG. 9 illustrates a signaling interaction flow of uplink transmission according to another embodiment of the present disclosure;

FIG. 10 illustrates a signaling interaction flow of downlink transmission according to the present disclosure; and FIG. 11 is a block diagram illustrating an exemplary configuration of computer hardware.

DETAILED DESCRIPTION OF THE EMBODIMENTS

The spatial domain interference suppression technology, as an effective technology to resist interference without sacrificing system performance, has been widely studied for application in inter-cell interference coordination in recent years. The idea of this technology is to achieve the purpose of interference suppression by utilizing the spatial difference between the interference user and the served user, generally based on the multiple-input multiple-output (MIMO) technology. In the MIMO system, space-division multiplexing and beamforming are two technical means for implementing multi-user communication. Better interference suppression can be achieved, and the complexity of the system structure can be reduced by combining these two means, which is a trend of the study on MIMO system in recent years. In addition, studies are also performed on the large-scale deployment of antennas on the base station side. In a time division duplex system, the channel characteristics of the uplink and the downlink are reciprocal within a coherence time period. Therefore, the base station can estimate the channel state using uplink channel information, and use the estimated channel state for precoding of downlink transmission. In the frequency division duplex system, the channel characteristics of the uplink and the downlink are not reciprocal, the user terminal needs to estimate the downlink channel state information based on the pilot information transmitted by the base station and feed it back to the base station. The base station performs precoding processing according to the feedback channel state information. The pilot overhead for estimating the downlink channel state information increases linearly with the number of antennas on the base station side, and the amount of information fed back by the user terminals correspondingly increase linearly.

Figure 1:
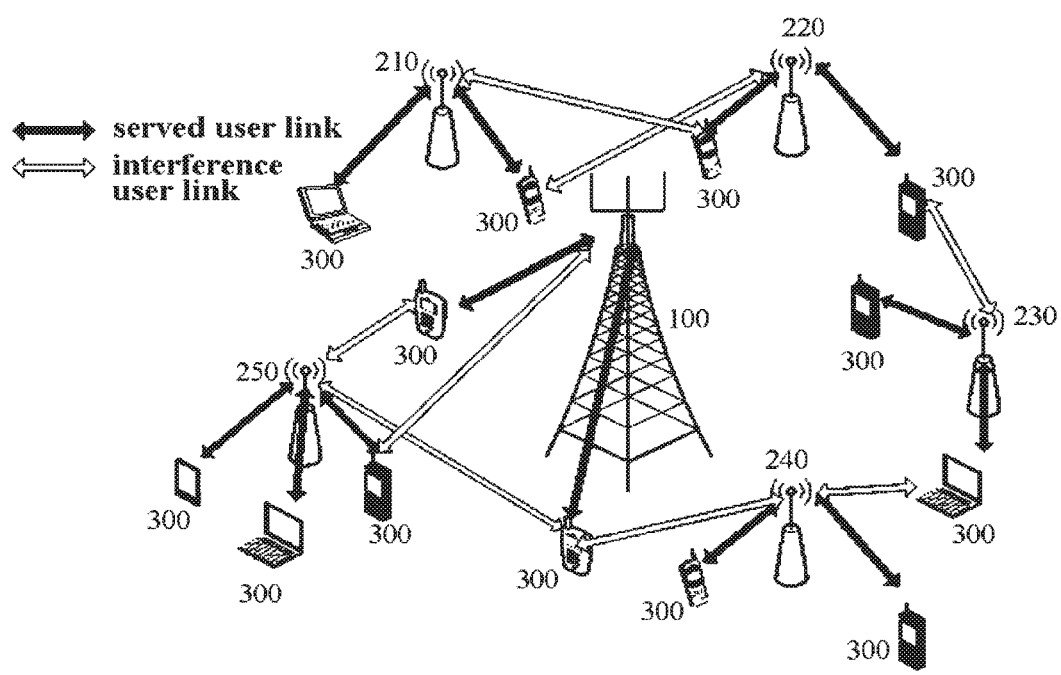
FIG. 1 is a schematic diagram illustrating a wireless communication system in which a large number of small base stations are deployed.

FIG. 1 schematically illustrates a wireless communication system to which the present disclosure is applicable. The system includes a macro base station 100, a plurality of small base stations 210 to 250 and a plurality of user terminals 300 within the coverage of the macro base station 100. As shown in the figure, the user terminals 300 may include user terminals served by the macro base station 100 and user terminals served by the small base stations 210 to 250. In addition, the user terminals 300 may include various portable mobile communication terminals such as mobile phone and laptop computer. Dark arrows in the figure illustrate communication links between the macro base station or each small base station and the user terminals served by it. Light (hollow) arrows illustrate communication links between the macro base station or each small base station and other user terminals which are not served by it, which communication links represent interferences.

As compared with the coverage of several kilometers and a higher transmission power of the macro base station 100, the small base stations 210 to 250 serve user terminals within a range of tens of meters to hundreds of meters at a lower transmission power. Due to the large number of small base stations, interference coordination management between neighboring small base stations and between the small base station and the macro base station is critical to the communication performance of the system. For example, assuming that small base station 210 is in operation state, user terminals served by a neighboring small base station or served by the macro base station (hereinafter referred to as an "interference user terminal" or "interference terminal") enter the coverage of the small base station 210, the small base station 210 and these interference user terminals interfere with each other. Specifically, in the uplink, the small base station 210 is interfered by these interference user terminals; while in the downlink, these interference user terminals are interfered by the signals transmitted by the small base station 210.

With respect to the wireless communication system shown in FIG. 1, a method for implementing multi-cell multi-user interference coordination and communication by estimating the arrival angles of the signals transmitted by respective user terminals is provided according to the present disclosure.

Figure 2:
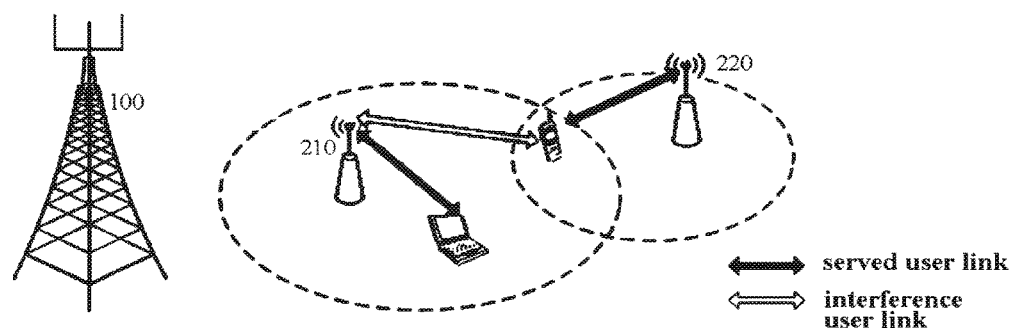
FIGS. 2 to 4 illustrate scenarios where interference exists in the wireless communication system.
Figure 3:
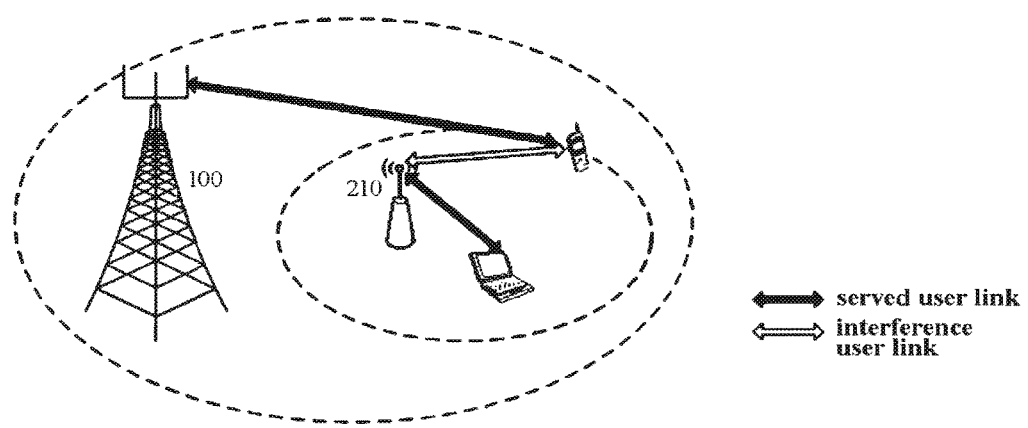
Figure 4:
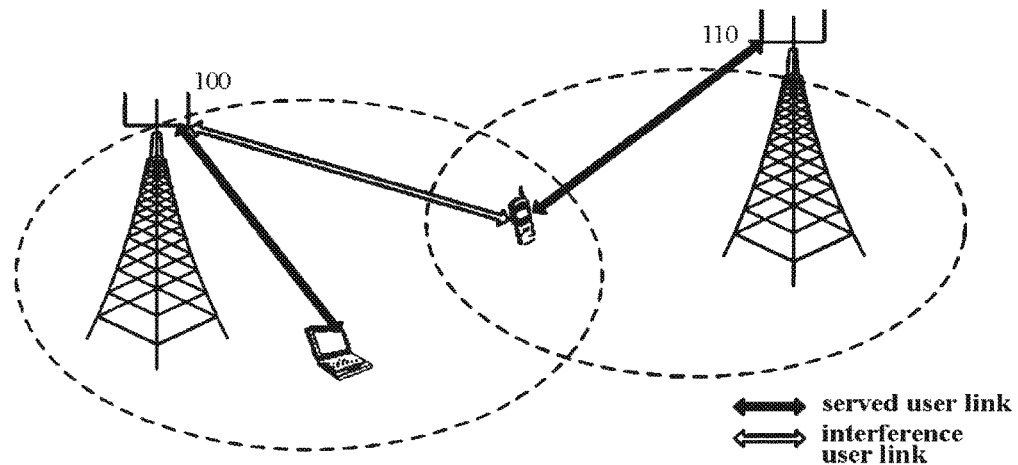

FIGS. 2 to 4 illustrates several scenarios with interferences. FIG. 2 illustrates a case where there is interference between the small base station 210 and the small base station 220. As shown in FIG. 2, there is a region of overlapping coverage of the small base station 210 and the small base station 220. When the small base station 210 detects that the states of users within the coverage thereof change (including the appearance of a new served user, or interference generated due to a user served by the small base station 220 entering the coverage thereof), the small base station 210 estimates the arrival angles of the signals transmitted by respective users, and determines which arrival angles belong to the served user terminals and which arrival angles belong to the interference user terminals by means of signaling interaction with the small base station 220. After the arrival angles of signals transmitted by all user terminals are estimated, interference coordination and multi-user communication are performed between the served user terminals and the interference user terminals.

FIG. 3 illustrates a case where there is interference between the small base station 210 and the macro base station 100. As shown in FIG. 3, the small base station 210 is within the coverage of the macro base station 100. When the small base station 210 detects that the states of users within the coverage thereof change (including the appearance of a new served user, or interference generated due to a user served by the macro base station 110 entering the coverage thereof), the small base station 210 estimates the arrival angles of the signals of respective user terminals, and determines which arrival angles belong to the served user terminals and which arrival angles belong to the interference user terminals by means of signaling interaction with the macro base station 100. After the arrival angles of signals of all user terminals are estimated, interference coordination and multi-user communication are performed between the served user terminals and the interference user terminals.

FIG. 4 illustrates a case where there is interference between the macro base station 100 and a macro base station 110. As shown in FIG. 4, there is a region of overlapping coverage of the macro base station 100 and the macro base station 110. When the macro base station 100 detects that the states of users within the coverage thereof change (including the appearance of a new served user, or interference generated due to a user served by the macro base station 110 entering the coverage thereof), the macro base station 100 estimates the arrival angles of the signals of respective user terminals, and determines which arrival angles belong to the served user terminals and which arrival angles belong to the interference user terminals by means of signaling interaction with the macro base station 110. After the arrival angles of signals of all user terminals are estimated, interference coordination and multi-user communication are performed between the served user terminals and the interference user terminals.

The following is a case where the base station 210 is taken as an example to describe how a small base station determines whether an interference user terminal exists within the coverage thereof. The small base station 210 may receive information for indicating whether there is a user terminal served by the macro base station 100 or a neighboring small base station (e.g., small base stations 220, 250) from the macro base station 100. In a case of the information indicating that there is no user terminal served by the macro base station 100 or the neighboring small base station, the small base station 210 determines that there is no interference terminal within the coverage thereof. In a case of the information indicating that there is a user terminal served by the macro base station 100 or the neighboring small base station, the small base station 210 determines that there is an interference terminal within the coverage thereof.

In a case of the small base station 210 determining that there is not any interference terminal within the coverage thereof, i.e., there are only served user terminals within the coverage thereof, the small base station 210 may directly estimate the arrival angles of the signals of respective served user terminals, to implement multi-user communications within the small cell served by the small base station 210.

In a case of the small base station 210 determining that there is an interference terminal within the coverage thereof, in addition to the arrival angles of the signals of the served user terminals, the small base station 210 estimates the arrival angle of the signal of the interference user terminal, and implements interference coordination and communications of the served users using the estimated arrival angles of respective user terminals.

Based on the direction of data transmission in the network, the data transmission is divided into uplink transmission and downlink transmission. The signal transmitted in the uplink is referred to as an uplink signal, and the signal transmitted in the downlink is referred to as a downlink signal, which is described in the following.

Uplink Transmission

It is assumed that there are a plurality of user terminals within the coverage of a small base station, including $N_1$ served terminals and $N_2$ interference terminals, and $K=N_1+N_2$. (in the present disclosure, it is assumed that the subscripts 1 to $N_1$ represent served terminals, and the subscripts $(N_1+1)$ to $(N_1+N_2)$ represent interference terminals). In this case, the uplink signal $y_0$ received by the small base station may be expressed by the following equation:

$$y_0 = \underbrace{\sum_{i=1}^{N_1} \alpha_i^{UL} \varepsilon_i s_i}_{\text{served terminal}} + \underbrace{\sum_{i=N_1+1}^{K=N_1+N_2} \alpha_i^{UL} \varepsilon_i s_i}_{\text{interference terminal}} + n,$$

where $\alpha_i^{UL}$ represents a uplink steering vector of the i-th user terminal (which may be a served terminal or an interference terminal), which is determined primarily by an antenna array model of the small base station, and the wave length and the arrival angle of the signal transmitted by the user terminal. For example, if the antenna array is a M×N array, $\lambda_{up}$ is the wavelength of the uplink signal, and $\lambda_{up}=c/f_{up}$, where c is the light speed, and $f_{up}$ is the carrier frequency of the uplink, $\varphi_i$ and $\theta_i$ are the arrival azimuth angle and the arrival pitch angle of the signal transmitted by the i-th user terminal respectively, the uplink steering vector of the i-th user terminal may be expressed as $$\alpha_i^{UL} = \exp\left(j\frac{2\pi}{\lambda_{up}}\begin{bmatrix} x_1 & y_1 \\ \vdots & \vdots \\ x_{MN} & y_{MN} \end{bmatrix}\begin{bmatrix} \sin\theta_i\cos\varphi_i \\ \sin\theta_i\sin\varphi_i \end{bmatrix}\right),$$

where $(x_n, y_n)$ represents the location of a n-th array element in the entire antenna array.

In addition, in the above equation, $\varepsilon_i$ represents the channel gain of a channel from the i-th user terminal to the antenna array, $S_i$ represents the signal transmitted by the i-th user terminal, and n represents a noise received by the antenna array.

The representation of the uplink signal $y_0$ received by the small base station is provided above. In the following, two methods for estimating the arrival angle of the signal of the user terminal based on signal which is spread according to the present disclosure are described.

(1) Arrival Angle Estimation Method Based on Data (a) Signal Model

Firstly, it is assumed that there are K user terminals within the coverage of the small base station, including $N_1$ served terminals and $N_2$ interference terminals ($K=N_1+N_2$). As described above, it is assumed that the subscripts 1 to $N_1$ represent served terminals, and the subscripts ($N_1+1$) to ($N_1+N_2$) represent interference terminals. In addition, M×N antennas are provided on the small base station side. These antennas are arranged in a planer array, and each user terminal corresponds to one antenna.

Assuming that the length of the signal transmitted by each user terminal is G, the signal transmitted by the i-th user terminal may be expressed by the following equation:

$$s_i = [s_{i,1}, s_{i,2}, \ldots, s_{i,L}, \ldots, s_{i,G}] \quad i=1, \ldots, K$$

Figure 5:
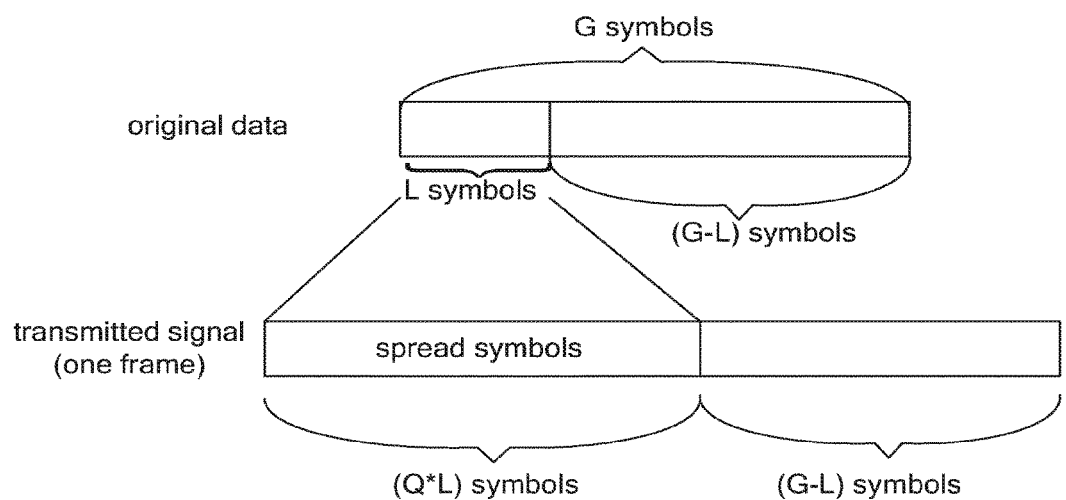
FIG. 5 schematically illustrates a frame structure of a signal transmitted by a user terminal.

The arrival angle estimation method according to this embodiment estimates the arrival angle of the signal using the first L (for example, L≥50) symbols of the data to be transmitted by each user terminal. It is to be noted that, the system overhead will be increased due to great value of L. In a case that L≥50, with the increase of L, improvement of the system performance is very small. Therefore, it is suggested that L takes a smaller value within this range. Specifically, each user terminal uses a random orthogonal code to spread the first L symbols of the data to be transmitted, and then transmits a symbol sequence including the first L spread symbols and (G-L) non-spread symbols. FIG. 5 schematically illustrates a frame structure of the signal transmitted by the user terminal.

In this case, the spread signal of the i-th user terminal may be expressed by the following equation:

$$d_i = s_i \otimes p_i,$$

where $p_i = [p_{i,1}, p_{i,2}, \ldots p_{i,Q}]$ ($p_i^H p_i = Q$, $p_j^H p_i = 0$ $i \neq j$) is the spreading code used by the i-th user terminal, $\otimes$ represents a Kronecker product, and Q represents spreading length (Q≥K).

The signal transmitted by the i-th user terminal may be expressed by a sequence including (Q*L) spread symbols $d_i$ and (G-L) non-spread symbols, as expressed by the following equation:

$$x_i = [d_i, s_{i,L+1}, s_{i,L+2}, \ldots, s_{i,G}].$$

The following matrix $A_{up}$ represents a uplink steering vector matrix for the served terminals and the interference terminals:

$$A_{up} = \begin{bmatrix} \alpha_{1,1}^{UL} & \alpha_{1,2}^{UL} & \cdots & \alpha_{1,K}^{UL} \\ \alpha_{2,1}^{UL} & \alpha_{2,2}^{UL} & \cdots & \alpha_{2,K}^{UL} \\ \vdots & \vdots & \ddots & \vdots \\ \alpha_{M\times N,1}^{UL} & \alpha_{M\times N,2}^{UL} & \cdots & \alpha_{M\times N,K}^{UL} \end{bmatrix},$$

where $\alpha_{i,j} = (\alpha_i^{UL})_j$ represents a j-th element of the uplink steering vector of the i-th user terminal (which is a served terminal or an interference terminal). Since the number of antennas on the small base station side is M×N, the size of the uplink steering vector matrix $A_{up}$ is (MN)×K.

In this case, the spread signal received by the small base station may be represented by the following equation:

$$T = A_{up} F_{up} \times \begin{bmatrix} d_1 \\ d_2 \\ \vdots \\ d_K \end{bmatrix} + N_T = \begin{bmatrix} t_{1,1} & t_{1,2} & \cdots & t_{1,(Q\times L)} \\ t_{2,1} & \ddots & \cdots & t_{2,(Q\times L)} \\ \vdots & & \ddots & \vdots \\ t_{(M\times N),1} & t_{(M\times N),2} & \cdots & t_{(M\times N),(Q\times L)} \end{bmatrix},$$

where $N_T$ is noise component, $F_{up}$ is large-scale fading coefficient of the uplink channel, and $F_{up}$ may be expressed by the following equation:

$$F_{up} = \begin{bmatrix} \varepsilon_1 & & \\ & \ddots & \\ & & \varepsilon_K \end{bmatrix},$$

where $\varepsilon_i$ is the channel large-scale fading coefficient of the uplink transmission of the i-th user terminal.

(b) Steps of the Arrival Angle Estimation Method Based on Signal

① The small base station distinguishes signals belong to different user terminals from the received signal using a pilot signal, and estimates the arrival angles of signals of respective user terminals. For example, the signal used in estimating the arrival angle for a certain user terminal (for example, the user terminal 1) may be expressed by the following matrix $Y_1$:

$$Y_1 = \begin{bmatrix} \dfrac{t_{1,1}\times p_{1,1} + t_{1,2}\times p_{1,2} \cdots + t_{1,K}\times p_{1,Q}}{Q} & \dfrac{t_{1,(Q+1)}\times p_{1,1} + t_{1,(Q+2)}\times p_{1,2} \cdots + t_{1,(2Q)}\times p_{1,Q}}{Q} & \cdots & \dfrac{t_{1,((L-1)Q+1)}\times p_{1,1} + t_{1,((L-1)Q+2)}\times p_{1,2} \cdots + t_{1,(LQ)}\times p_{1,Q}}{Q} \\ \dfrac{t_{2,1}\times p_{1,1} + t_{2,2}\times p_{1,2} \cdots + t_{2,K}\times p_{1,Q}}{Q} & \ddots & & \vdots \\ \vdots & & \ddots & \vdots \\ \dfrac{t_{(M\times N),1}\times p_{1,1} + t_{(M\times N),2}\times p_{1,2} \cdots + t_{(M\times N),K}\times p_{1,Q}}{Q} & \cdots & \cdots & \dfrac{t_{(M\times N),((L-1)Q+1)}\times p_{1,1} + t_{(M\times N),((L-1)Q+2)}\times p_{1,2} \cdots + t_{(M\times N),(LQ)}\times p_{1,Q}}{Q} \end{bmatrix}$$

The dimension of $Y_1$ is MN×L. Therefore, $Y_1$ may be further expressed as follows:

$$Y_1 = \begin{bmatrix} y_{1,1} & y_{1,2} & \cdots & y_{1,L} \\ y_{2,1} & y_{2,2} & & \vdots \\ \vdots & & \ddots & \vdots \\ y_{(M \times N),1} & y_{(M \times N),2} & \cdots & y_{(M \times N),L} \end{bmatrix}.$$

Then, the arrival angle of the signal of the user terminal 1 is estimated using the signal $Y_1$ based on the ESPRIT algorithm.

In the following, the method for estimating the arrival angle of the signal using the ESPRIT algorithm is described.

② The following three sub-matrixes are constructed in the reception signal $Y_1$:

$$Y_{1,1}=Y_1(1{:}M-1,{:})$$

$$Y_{1,2}=Y_1(2{:}M,{:})$$

$$Y_{1,3}=Y_1(M+1{:}2{\times}M-1,{:}),$$

where $Y_1$(row 1:row2,:) represents a new matrix composed of the row1-th row to the row2-th row of the matrix $Y_1$.

The dimension of each of $Y_{1,1}$, $Y_{1,2}$, and $Y_{1,3}$ is (M−1)×L. Therefore, the following two Matrix $R_1$ and $R_2$ can be obtained:

$$R_1 = [\, Y_{1,1} \quad Y_{1,2} \quad Y_{1,3} \,]$$

$$R_2 = \begin{bmatrix} Y_{1,1} \\ Y_{1,2} \\ Y_{1,3} \end{bmatrix},$$

Where the dimension of $R_1$ is (M−1)×3L, and the dimension of $R_2$ is 3(M−1)×L.

Singular value decomposition (SVD) is performed on each of $R_1$ and $R_2$ to obtain the following result:

$$R_1 = U_1 \times S_1 \times V_1^H$$

$$R_2 = U_2 \times S_2 \times V_2^H,$$

where $U_1$, $U_2$, $V_1$ and $V_2$ are unitary matrixes, $S_1$ and $S_2$ are diagonal matrixes, and $(\Box)^H$ represents conjugate transposition.

Let $$\begin{cases} Q_{u1} = U_1(:,1{:}D) \\ Z_{v2} = V_2(:,1{:}D) \end{cases},$$

where D represents logarithm of arrival angle to be estimated, and calculate $$\begin{cases} E_1 = Q_{u1}^H \times Y_{1,1} \times Z_{v2} \\ E_2 = Q_{u1}^H \times Y_{1,2} \times Z_{v2} \\ E_3 = Q_{u1}^H \times Y_{1,3} \times Z_{v2} \end{cases}, \text{ and } \begin{cases} E_a = E_1^{-1} \times E_2 \\ E_b = E_1^{-1} \times E_3 \end{cases}.$$

Perform Schur decomposition on $E_b$ to obtain the following result:

$$E_b = C_E \times T_E \times C_E^H.$$

Let $F = C_E^H \times C_E^H \times E_a \times C_E$, and perform Schur decomposition on F to obtain the following result:

$$F = C_F \times T_F = C_F^H.$$

Calculate diagonal phase coordinates y of $T_E$ and diagonal phase coordinates x of $T_F$, and obtain:

$$\text{coordinate}(x) = \frac{\text{angle}(T_F)}{2\pi} \times \frac{d}{\lambda_{up}}$$

$$\text{coordinate}(y) = \frac{\text{angle}(T_E)}{2\pi} \times \frac{d}{\lambda_{up}},$$

where d is the distance between two neighboring antennas.

Let variable point=coordinate(x)+i×coordinate(y), let angle(point) represents the phase of point, and let abs(point) represents the absolute value of point. Then, the estimated value of the arrival angle of the signal of the user terminal 1 can be obtained as follows:

the estimated azimuth angle = $\frac{\pi}{2}$ − angle(point), and the estimated pitch angle = arccos(abs(point)).

Therefore, the arrival angle of the signal transmitted by a certain user terminal (for example, the user terminal 1) is obtained by calculation.

(2) Arrival Angle Estimation Method Based on Sounding Reference Signal

In this embodiment, the arrival angle of the signal of a user terminal is estimated based on a sounding reference signal (SRS) transmitted by the user terminal.

Specifically, each user terminal in the wireless communication system according to the present disclosure generates SRS data in the frequency domain according to instruction from the small base station, spreads the SRS data using spreading code allocated by the small base station, then transforms the spread SRS data into SRS signal in the time domain through the inverse Fourier transform (IFFT), and transmits the SRS signal In one aspect, served terminals served by the same small base station are allocated with the same spreading code, generate SRS data in the frequency domain according to the instruction from the small base station, spread the generated SRS data using the allocated same spreading code, and perform the inverse Fourier transform and transmission. For example, the generated SRS data has a length of 10, and is a signal in the frequency domain. Assuming that the length of the spreading code is 8, the length of the spread SRS data is 10×8=80. After obtaining the spread SRS data, the served terminals served by the same small base station allocate the SRS data to difference subcarriers according to instructions from the small base station, to enable the SRS data to be orthogonal to one another in the frequency domain. Then the signals are transformed into time domain through the inverse Fourier transform, and the transformed SRS signals are transmitted.

In another aspect, the spreading codes allocated to the user terminals served by different small base stations are orthogonal to one another. In this case, even the user terminals served by different small base stations occupy the same frequency band, they can be distinguished based on spreading codes which are orthogonal to one another, thereby estimating the arrival angles of the signals of all user terminals.

The small base station can receive spread SRS signals transmitted by all user terminals within the coverage thereof, and calculate the arrival angles of signals of respective user terminals based on the spread signals. The method for calculating the arrival angle based on the spread SRS may adopt the ESPRIT algorithm, which is described above and is not repeated here.

Two methods for estimating the arrival angle of the signal of the user terminal based on the spread signal according to the present disclosure are described above. In the following, a processing of restoring the signal of the served terminal by the small base station using the estimated arrival angle of the signal of the user terminal in the uplink is described.

A two-layer MIMO structure, which includes a smart antenna layer (SA) layer and a MIMO layer, is proposed according to the present disclosure. In the following, processing in the SA layer is described first.

The smart antenna array on the small base station side includes sub-arrays corresponding to respective served terminals. An i-th served terminal is taken as an example, the received signal $$y_0 = \underbrace{\sum_{i=1}^{N_1} \alpha_i^{UL} \varepsilon_i s_i}_{\text{served terminal}} + \underbrace{\sum_{i=N_1+1}^{K=N_1+N_2} \alpha_i^{UL} \varepsilon_i s_i}_{\text{interference terminal}} + n$$

as described above is processed by a sub-antenna array corresponding to the i-th served terminal using a reception weight vector $w_i^{UL}$ corresponding to the i-th sewed terminal. The processed signal may be) expressed as $(w_i^{UL})^H y_0$. In this case, the corresponding signal to interference and noise ratio (SINR) can be expressed by the following equation:

$$SINR = \frac{(w_i^{UL})^H R_{user}^{UL} w_i^{UL}}{(w_i^{UL})^H \bar{R}_{user}^{UL} w_i^{UL}}, \text{ where}$$

$$R_{user}^{UL} = E\left[\left(\sum_{i=1}^{N_1} \alpha_i^{UL} \varepsilon_i s_i\right)\left(\sum_{i=1}^{N_1} \alpha_i^{UL} \varepsilon_i s_i\right)^H\right] = \sum_{i=1}^{N_1} P_i^{UL} \alpha_i^{UL} (\alpha_i^{UL})^H$$

represents the covariance matrix of the received signals of all sewed user terminals, where $E[\cdot]$ represents calculating expectation, $\alpha_i^{UL}$ is the uplink steering vector of the i-th user terminal, $\varepsilon_i$ is the uplink channel large-scale fading coefficient of the i-th user terminal, $S_i$ is the signal transmitted by the i-th user terminal, and $P_i^{UL}$ represents the power of the signal of the i-th user terminal received by the antenna array which is taken to be constant. In addition, $$\bar{R}_{user}^{UL} = E\left[\left(\sum_{j=N_1+1}^{N_1+N_2} \alpha_j^{UL} \varepsilon_j s_j + n\right)\left(\sum_{j=N_1+1}^{N_1+N_2} \alpha_j^{UL} \varepsilon_j s_j + n\right)^H\right]$$

represents the covariance matrix of the received signals of all interference user terminals and noises, where $\alpha_j^{UL}$ represents the uplink steering vector of the j-th interference terminal, $\varepsilon_j$ is the uplink channel fading coefficient of the j-th interference terminal, $S_j$ is the signal transmitted by the j-th interference terminal. It is to be noted that the value of j ranges from $(N_1+1)$ to $(N_1+N_2)$.

An i-th sub-array is mainly considered to be used for restoring the signal of the i-th sewed user terminal, while suppressing all the received interfering signals and noises, and signals of the remaining $N_1-1$ sewed user terminals do not need to be suppressed. That is, the i-th sub-array includes not only all information of the i-th sewed user terminal, but also a part of information of the remaining $N_1-1$ served user terminals.

A optimization objective function for solving the reception weight vector for the i-th sub-array may be established as follows:

$$\max \frac{(w_i^{UL})^H \alpha_i^{UL} (\alpha_i^{UL})^H w_i^{UL}}{(w_i^{UL})^H \bar{R}_{user}^{UL} w_i^{UL}}.$$

By restricting the gain in the signal direction of the i-th served user terminal to meet a requirement of a constant, the above optimization objective function may be transformed into the following equation:

$$\begin{cases} \min(w_i^{UL})^H \bar{R}_{user}^{UL} w_i^{UL} \\ \text{s.t. } (w_i^{UL})^H \alpha_i^{UL} = 1 \end{cases}.$$

The above equation represents the modified linear minimum variance constraint (LCMV) criterion proposed according to the present disclosure.

By solving the above equation, the reception weight vector for the i-th sub-array can be obtained as follows:

$$w_i^{UL} = \frac{(\bar{R}_{user}^{UL})^{-1} \alpha_i^{UL}}{(\alpha_i^{UL})^H (\bar{R}_{user}^{UL})^{-1} \alpha_i^{UL}}.$$

Considering all sub-arrays, the transformation matrix for the SA layer may be expressed as follows:

$$w^{UL} = [w_1^{UL} \ldots w_{N_1}^{UL}].$$

Therefore, after the processing in the SA layer, the signal received by the small base station may be expressed by the following equation:

$$r = (w^{UL})^H y_0.$$

In the following, the processing in the MIMO layer is described.

In the MIMO layer, signals of all served user terminals are restored in combination. After the above processing of the SA layer, a virtual $N_1 \times N_1$ equivalent MIMO channel is obtained (where $N_1$ is the number of the served user terminals). The equivalent channel array may be expressed by the following equation:

$$H_{eq}^{UL} = (w^{UL})^H A^{UL} \Omega,$$

where $A^{UL} = [\alpha_1^{UL} \ldots \alpha_{N_1}^{UL}]$, and $$\Omega = \begin{bmatrix} \varepsilon_1 & & \\ & \ddots & \\ & & \varepsilon_{N_1} \end{bmatrix}.$$

In addition, $\alpha_i^{UL}$ represents the uplink steering vector of the i-th served terminal, $\varepsilon_i$ represents the uplink channel large-scale fading coefficient of the i-th served terminal, where the value of i ranges from 1 to $N_1$.

Meanwhile, it is to be noted that, after the processing in the SA layer, noise in the equivalent MIMO channel is non-white noise. Therefore, before processing the multi-user signals, the noise in the equivalent MIMO channel needs to be whitened. In the equivalent MIMO channel, a covariance matrix of interferences and noise may be expressed by the following equation:

$$\sum = \sum_{j=N_1+1}^{N_1+N_2} \overline{P}_j ((W^{UL})^H \alpha_j^{UL})((W^{UL})^H \alpha_j^{UL})^H + \sigma^2 (W^{UL})^H W^{UL}$$

$$= \sum{}^{\frac{1}{2}} (\sum{}^{\frac{1}{2}})^H,$$

where $\overline{P}_j$ represents the power of the signal of a j-th interference user terminal received by the antenna array (where the value of j ranges from $(N_1+1)$ to $(N_1+N_2)$), and $\sigma^2$ represents the variance of the received noise.

The following equation can be obtained by performing singular value decomposition on the above covariance matrix:

$$\sum = U_\Sigma \Lambda_\Sigma U_\Sigma^H = U_\Sigma \Lambda_\Sigma^{\frac{1}{2}} \Lambda_\Sigma^{\frac{1}{2}} U_\Sigma^H,$$

where $\Lambda_\Sigma$ is a diagonal matrix, the elements on the diagonal are non-negative, and U is a unitary matrix. Then the following equation may be obtained:

$$\sum{}^{\frac{1}{2}} = U_\Sigma \Lambda_\Sigma^{\frac{1}{2}}.$$

The following equation can be obtained by performing noise whitening on the equivalent MIMO channel:

$$\overline{H}^{UL} = \Sigma^{-\frac{1}{2}} H_{eq}^{UL} = \Sigma^{-\frac{1}{2}} (W^{UL})^H A^{UL} \Omega,$$

where $\sum{}^{-\frac{1}{2}} \sum{}^{\frac{1}{2}} = I$, and $\Sigma^{-\frac{1}{2}} = \Lambda_\Sigma^{-\frac{1}{2}} U_\Sigma^H.$ The following equation can be obtained by whitening received signals obtained in the SA layer:

$$r_w = \Sigma^{-\frac{1}{2}} r = \Sigma^{-\frac{1}{2}} (W^{UL})^H y_0.$$

Then, the zero-forcing algorithm is used to obtain the restored signal of the served terminal, which can by expressed by the following equation:

$$b = [(\overline{H}^{UL})^H \overline{H}^{UL}]^{-1} (\overline{H}^{UL})^H r_w = [(\overline{H}^{UL})^H \overline{H}^{UL}]^{-1} (\overline{H}^{UL})^H \Sigma^{-\frac{1}{2}} r$$

-continued $$= \underbrace{[(\overline{H}^{UL})^H \overline{H}^{UL}]^{-1} (\overline{H}^{UL})^H \Sigma^{-\frac{1}{2}}}_{MIMO\ layer} \underbrace{(W^{UL})^H y_0}_{SA\ layer}.$$

Alternatively, the least mean square error algorithm may be used to obtain the restored signal of the served terminal, which can by expressed by the following equation:

$$b = \left[(\overline{H}^{UL})^H \overline{H}^{UL} + \frac{N_1}{\sum_{i=1}^{N_1} P_i^{UL}} I\right]^{-1} (\overline{H}^{UL})^H r_w$$

$$= \left[(\overline{H}^{UL})^H \overline{H}^{UL} \frac{N_1}{\sum_{i=1}^{N_1} P_i^{UL}} I\right]^{-1} (\overline{H}^{UL})^H \Sigma^{-\frac{1}{2}} r$$

$$= \underbrace{\left[(\overline{H}^{UL})^H \overline{H}^{UL} + \frac{N_1}{\sum_{i=1}^{N_1} P_i^{UL}} I\right]^{-1} (\overline{H}^{UL})^H \Sigma^{-\frac{1}{2}}}_{MIMO\ layer} \underbrace{(W^{UL})^H y_0}_{SA\ layer}.$$

Figure 6:
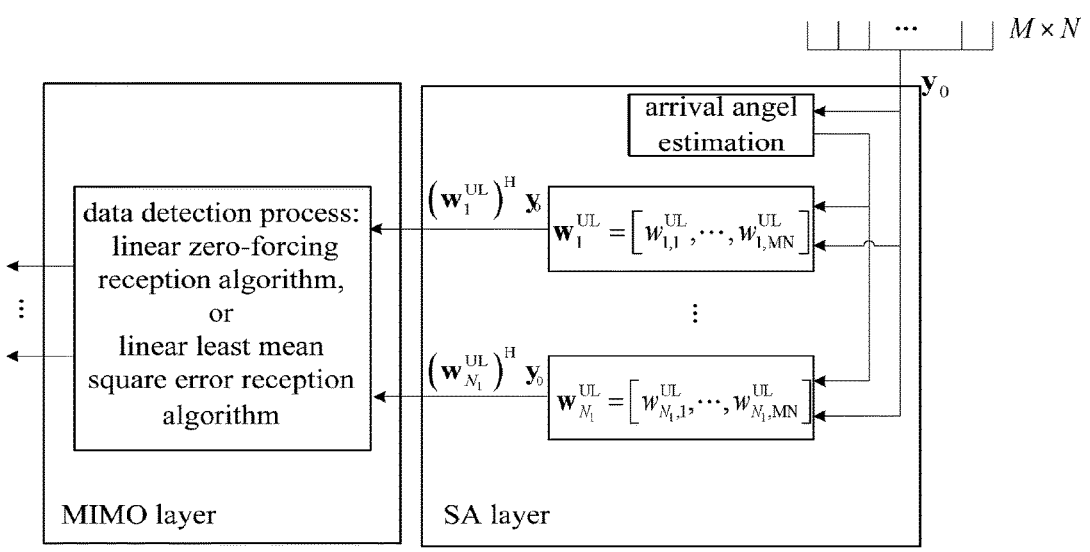

In the above, the processing of the small base station restoring the signal of the served user terminal using the estimated arrival angle of the signals of the user terminals by means of processing in the SA layer and the processing in the MIMO layer in the uplink is described. The processing in the SA layer and the processing in the MIMO layer in the uplink according to the present disclosure can be clearly understood by referring to FIG. 6.

In addition, the estimated arrival angle of the signal of the user terminal according to the present disclosure can be used to perform beamforming according to the conventional LCMV criterion. This process is described in the following.

The small base station calculates the beamforming reception weight vector for each served user terminal according to the conventional LCMV criterion. Specifically, the small base station calculates the beamforming reception weight vector used for receiving the signal of the i-th served user terminal according to the LCMV criterion expressed by the following equation:

$$\begin{cases} \min(w_i^{UL})^H R_{Rec}^{UL} w_i^{UL} \\ s.t.\ (w_i^{UL})^H \alpha_i^{UL} = 1 \end{cases},$$

where $R_{rec}^{UL} = E\left[\left(\sum_{j=1}^{N_1+N_2} \alpha_j^{UL} \varepsilon_j s_j + n\right)\left(\sum_{j=1}^{N_1+N_2} \alpha_j^{UL} \varepsilon_j s_j + n\right)^H\right].$ The calculated beamforming reception weight vector is expressed by the following equation:

$$w_i^{UL} = \frac{(R_{Rec}^{UL})^{-1} \alpha_i^{UL}}{(\alpha_i^{UL})^H (R_{Rec}^{UL})^{-1} \alpha_i^{UL}}.$$

Therefore, the detection of the signal of the i-th served user terminal may be expressed by the following equation:

$$r_i = \frac{(w_i^{UL})^H y_0}{\varepsilon_i},$$

where $r_i$ represents the initially restored signal of the i-th served user terminal obtained after the processing of the smart antenna layer, $y_0$ represents the signal received by the antenna array, and $\varepsilon_i$ represents the channel fading coefficient of the i-th served user terminal.

Downlink Transmission

This technology is applicable to both a time division duplex system and a frequency division duplex system. The following is a case where the frequency division duplex system is taken as an example to describe the processing of this technology during downlink transmission.

In the frequency division duplex system, the carrier frequency of the uplink is different from that of the downlink, thus the channel characteristics of the uplink and downlink are not reciprocal. However, the arrival angle of the uplink signal and the departure angle of the downlink signal are reciprocal. That is, direction angles of the uplink and the downlink in the frequency division duplex system are reciprocal. Therefore, the beamforming transmission weight vector for downlink transmission can be calculated based on the arrival angle of the signal estimated in the uplink transmission.

As described above, since the arrival angle of the uplink signal and the departure angle of the downlink signal are reciprocal, in the downlink transmission, the small base station can first generate the downlink steering vector using the estimated arrival angle of the uplink signal. The downlink steering vector is different from the uplink steering vector because the difference in carrier frequency results in the difference in wavelength although the spacing of the antennas remains the same between the uplink transmission and downlink transmission.

In a case that there are $N_1$ served user terminals and $N_2$ interference user terminals (where $N_1+N_2=K$, and it is assumed that the subscripts 1 to $N_1$ represent $N_1$ served user terminals, and the subscripts $N_1+1$ to K represent $N_2$ interference user terminals), the downlink steering vector can be expressed by the following equation:

$$A_{down} = \begin{bmatrix} \alpha_{1,1}^{DL} & \alpha_{1,2}^{DL} & \cdots & \alpha_{1,K}^{DL} \\ \alpha_{2,1}^{DL} & \alpha_{2,2}^{DL} & \cdots & \alpha_{2,K}^{DL} \\ \vdots & \vdots & \ddots & \vdots \\ \alpha_{(M \times N),1}^{DL} & \alpha_{(M \times N),2}^{DL} & \cdots & \alpha_{(M \times N),K}^{DL} \end{bmatrix}^T,$$

where $(\cdot)^T$ represents transpose of a matrix, $\alpha_{i,j}^{DL}=(\alpha_i^{DL})_j$ represents a j-th element of the downlink steering vector of the i-th user terminal (which may be a served user terminal or an interference user terminal). In addition, $$\alpha_i^{DL} = \exp\left(j\frac{2\pi}{\lambda_{down}} \begin{bmatrix} x_1 & y_1 \\ \vdots & \vdots \\ x_{MN} & y_{MN} \end{bmatrix} \begin{bmatrix} \sin\theta_i\cos\varphi_i \\ \sin\theta_i\sin\varphi_i \end{bmatrix}\right),$$

where $\varphi_i$ and $\theta_i$ are the azimuth angle and the pith directed to the i-th user terminal respectively, $(x_n, y_n)$ represents the location of a n-th element in the entire antenna array, $\lambda_{down}$ represent the wavelength of the downlink transmission, and $\lambda_{down}=c/f_{down}$, where c is light speed, and $f_{down}$ is the frequency of the downlink transmission.

Since the downlink transmission of the small base station affects the uplink transmission of the interference user terminal within the coverage of the small base station, it is necessary to reduce the interference of the downlink transmission of the small base station to the communication of the interference user terminal while maximizing the gain of the served user terminal. Based on such consideration, a modified LCMV criterion is proposed according to the present disclosure to calculate a transmission weight vector for downlink transmission. In this case, the modified LCMV criterion can be expressed by the following equation:

$$\begin{cases} \min_{w_i^{DL}} (w_i^{DL})^H \overline{R}_d w_i^{DL} \\ (w_i^{DL})^H \alpha_i^{DL} = 1 \end{cases},$$

where $w_i^{DL}$ is the downlink transmission weight vector, $\overline{R}_d = A_{down}(N_1+1:K,:)E\{xx^H\}A_{down}(N_1+1:K,:)^H$ represents covariance matrix of the signals transmitted to all interference user terminals on the downlink, $A_{down}(N_1+1:K,:)$ represents a new matrix composed of the $(N_1-1)$-th row to the K-th row of the matrix $A_{down}$, which is the downlink steering vector corresponding to the interference user terminal, x represents the transmitted signal on the antenna, $\alpha_i^{DL}$ is the downlink steering vector of the i-th user terminal.

According to the above criterion, the downlink transmission weight vector $w_i$ can be calculated as follows:

$$w_i^{DL} = \frac{\overline{R}_d^{-1} \alpha_i^{DL}}{(\alpha_i^{DL})^H \overline{R}_d^{-1} \alpha_i^{DL}}.$$

A channel matrix of channels from the small base station to the served user terminals may be expressed as $H=F_{down}(1:N_1,1:N_1)A_{down}(1:N_1,:)$, where $A_{down}(1:N_1,:)$ represents a new matrix composed of the first row to the $N_1$-th row of the matrix $A_{down}$, $F_{down}(1:N_1,1:N_1)$ represent a new matrix composed of all elements of the first row to the $N_1$-th row and the first column to the $N_1$-th columns of the matrix $F_{down}$. $F_{down}$ represents downlink channel large-scale fading coefficients and is matrix $F_{down}$ may be expressed by the following equation:

$$F_{down} = \begin{bmatrix} \varepsilon_1^{DL} & & \\ & \ddots & \\ & & \varepsilon_{N_1+N_2}^{DL} \end{bmatrix},$$

where $\varepsilon_i^{DL}$ is the channel large-scale fading coefficient for the downlink transmission of the i-th user terminal (which may be a served terminal of an interference terminal).

Based on this, the estimated channel matrix for the channels from the small base station to the served user terminals may be defined by the following equation:

$$H_{estimate}=F_{down}(1:N_1,1:N_1)A_{down,est}(1:N_1,:),$$

where $A_{down,est}$ is the estimated value of the downlink steering vector $A_{down}$.

The transmission vector may be expressed as $z_i=Hw_i^{DL}$, where $w_i^{DL}$ is the downlink transmission weight vector corresponding to the i-th served user terminal Based on this, in a case that the transmission matrix Z is defined as $Z=[z_1, \ldots, z_{N_1}]$. an estimated value $Z_{estimate}$ of the transmission matrix Z can be obtained using the estimated channel matrix $H_{estimate}$, and is expressed by the following equation:

$$Z_{estimate} = H_{estimate}[w_1^{DL}, \ldots, w_{N_1}^{DL}],$$

where $w_i^{DL}$ is the downlink transmission weight vector corresponding to the i-th served user terminal obtained according to the modified LCMV criterion.

In a case of using zero-forcing equalization, a precode matrix for the downlink transmission may be expressed by the following equation:

$$P = \underbrace{[w_1^{DL}, \ldots, w_{N_1}^{DL}]}_{SA\ layer} \underbrace{Z_{estimate}^H (Z_{estimate} Z_{estimate}^H)^{-1}}_{MIMO\ layer}.$$

Therefore, the signal transmitted by the small base station may be expressed by the following equation:

$$x = Ps,$$

where s represents data to be transmitted by the small base station.

In the above, the processing of transmitting the signal for the served user terminal in the downlink by the small base station using the estimated arrival angle of the signal of the uplink transmission by means of the processing of the SA layer and the MIMO layer is described. The processing of the SA layer and the MIMO layer in the downlink transmission according to the present disclosure can be clearly understood by referring to FIG. 7.

FIGS. 8 to 10 illustrate signaling interaction flows in a wireless communication system according to the present disclosure. FIG. 8 illustrates a flow of estimating an arrival angle of a signal using a spread signal and restoring the signal of the served user terminal using the estimated arrival angle in the uplink transmission.

As shown in FIG. 8, at S801, a small base station 1 and a small base station 2 respectively report information regarding served user terminals within the coverage thereof to a macro base station.

At S802, the macro base station instructs each of the small base station 1 and the small base station 2 to allocate unique spreading codes which are orthogonal to one another to the served user terminals thereof, and makes an agreement on the length of the spreading code with the small base station 1 and the small base station 2.

At S802, the small base station 1 and the small base station 2 allocate spreading codes to the served user terminals thereof and specify the length of the spreading code, according to the instructions from the macro base station. At this time, the spreading code allocated to each user terminal in the wireless communication system is unique, and spreading codes for different user terminals are orthogonal to one another.

At S804, each of served user terminals of the small base station 1 and the small base station 2 spreads the previous part of symbols of data to be transmitted using the allocated spreading code according to the instruction from the small base station, while keeping the latter part of symbols unchanged, and then transmits a symbol sequence including the spread symbols and the non-spread symbols.

At S805, the small base station 1 and the small base station 2 estimate arrival angles of signals of respective user terminals, which include served user terminals and interference user terminals, within the coverage thereof using the spread symbols.

At S806, the small base station 1 and the small base station 2 calculate the uplink reception weight vectors for the served user terminals based on the modified LCMV criterion. In the smart antenna (SA) layer, the small base station 1 and the small base station 2 perform beamforming reception on signals on the antennas using the calculated reception weight vectors, and form the virtual MIMO layer.

At step S807, in the virtual MIMO layer, the small base station 1 and the small base station 2 perform combined detection on the signals of the served user terminals thereof using the zero-forcing algorithm or the least mean square error algorithm.

FIG. 9 illustrates a flow of estimating arrival angles of signals using the spread SRSs and restoring the information of the served user terminals using the estimated arrival angles in the uplink transmission.

As shown in FIG. 9, at S901, a small base station 1 and a small base station 2 respectively report information regarding served user terminals within the coverage thereof to a macro base station.

At S902, the macro base station allocates a spreading code to each small base station based on the reported information. Here, the spreading code allocated to the small base station 1 is orthogonal to the spreading code allocated to the small base station 2.

At S903, the small base station 1 and the small base station 2 respectively allocate the spreading codes allocated by the macro base station to served user terminals thereof. In this case, the same spreading code is allocated to served user terminals of the same small base station, and the spreading code allocated to the served user terminals of the small base station 1 is orthogonal to the spreading code allocated to the served user terminals of the small base station 2. In addition, the small base station 1 and the small base station 2 set SRS uplink configuration information for the served user terminals thereof At S904, the served user terminals of the small base station 1 and the small base station 2 generate SRSs using the configuration information, spread the SRSs using the allocated spreading codes and transmit the spread SRSs, according to instructions from the small base stations.

At S905, the small base station estimates arrival angles of signals of respective user terminals, which include served user terminals and interference user terminals, within the coverage thereof using the received spread SRSs.

At S906, the small base station 1 and the small base station 2 calculate the reception weight vectors for the served user terminals based on the modified LCMV criterion. In the smart antenna (SA) layer, the small base station 1 and the small base station 2 perform beamforming reception on signals on the antennas using the calculated reception weight vectors, and form the virtual MIMO layer.

At step S907, in the virtual MIMO layer, the small base station 1 and the small base station 2 perform combined detection on the signals of the served terminals thereof using the zero-forcing algorithm or the least mean square error algorithm.

FIG. 10 illustrates a flow of calculating the downlink transmission weight vectors for the served user terminals using the arrival angles estimated in the uplink transmission, and transmitting the signals for the served user terminals using the calculated transmission weight vectors in the downlink transmission.

As shown in FIG. 10, at S1001, the small base station 1 and the small base station 2 calculate steering vectors for the served user terminals and the interference user terminals based on the arrival angles of the signals estimated during the uplink transmission.

At S1002, the small base station 1 and the small base station 2 transmit pilot sequences, and the served user terminals estimate fading coefficients of the downlink channels, i.e., the large-scale fading coefficients, based on the received pilot information.

At S1003, the served user terminals feed the estimated fading coefficients back to the small base station 1 and the small base station 2.

At S1004, the small base station 1 and the small base station 2 calculate the transmission weight vectors for the served user terminals according to the modified LCMV criterion.

At S1005, the virtual MIMO layer is formed according to the calculated transmission weight vectors, such that the small base station 1 and the small base station 2 first perform zero-forcing precoding and then perform pre-weighting (that is, multiplying by the calculated transmission weight vector) on the data to be transmitted to the served user terminals.

At S1006, the small base station 1 and the small base station 2 transmit the pre-weighted signals to the served user terminals.

It is to be noted that, the method for estimating the arrival angles of the signals of the user terminals and the processing in the uplink and the downlink are described by taking the small base station as an example. However, the method and the processing may also be performed by the macro base station. When performed by the macro base station, signaling interaction between the small base station and the macro base station can be omitted in the signaling interaction flows shown in FIGS. 8 to 10. Instead, the macro base station directly communicates with the user terminals. Such modification is easy and apparent to those skilled in the art.

In the present disclosure, for the multi-cell (small cell) multi-user multi-interference environment in the future wireless communication, a method for estimating arrival angles of signals of user terminals based on spread signals (for example, spread data or spread SRSs), a two-layer MIMO structure (including a SA layer and a MIMO layer) and a modified LCMV algorithm applicable to the two-layer MIMO structure are proposed, and processing and signaling interaction flows in the uplink transmission and the downlink transmission are designed.

The technology of the present disclosure has the following advantages.

a. A two-layer MIMO structure for multi-cell interference coordination in uplink and downlink is proposed according to the present disclosure. Signals of interference user terminals are completely suppressed by the processing in the SA layer. A virtual MIMO layer is formed, and then combined detection is performed on information of the served user terminals in the virtual MIMO layer.

b. A modified LCMV criterion for the two-layer MIMO structure is proposed according to the present disclosure, which is capable of effectively improving system throughput and reducing the error rate during transmission.

c. In uplink transmission, the user terminals are distinguished from one another by data-based spreading in the present disclosure, thereby estimating arrival angles of signals of served user terminals and interference user terminals. In another embodiment, arrival angles of signals of user terminals are estimated based on the spread SRSs, thereby effectively reducing system overhead.

d. In downlink transmission, precoding for downlink transmission is performed using the arrival angles estimated in uplink transmission, which can effectively reduce the overhead of the feedback of the channel state information from the user terminals to the base station in the frequency division duplex system, especially in a case where the number of antennas at the transmitting side gradually increases.

e. The signaling interaction policy in the present disclosure is controlled by the macro bases station. Therefore, such signaling interaction policy is simple and easy to implement.

f. The physical layer algorithm in the present disclosure is based on the interference cancellation technique, and is suitable for interference coordination among multiple cells and capable of effectively improving system throughput.

The various devices or modules described herein are only logical and do not strictly correspond to physical devices or modules. For example, the functions of each of the modules described herein may be implemented by multiple physical entities, or the functions of multiple modules described herein may be implemented by a single physical entity.

The series of processes performed by each device or module in the above-described embodiment may be implemented by software, hardware, or a combination of software and hardware. The program included in the software may be stored in advance in a storage medium provided inside or outside each device. As an example, during execution, the programs are written to a random access memory (RAM) and executed by a processor (such as a CPU).

FIG. 11 is an exemplary configuration block diagram of computer hardware for executing the method or the processing of the present disclosure based on the program.

In a computer, a central processing unit (CPU) 1101, a read only memory (ROM) 1102 and a random access memory (RAM) 1103 are connected via a bus 1104.

An input/output interface 1105 is further connected to the bus 1104. The input/output interface 1105 is connected with the following components: an input unit 1106 formed by a keyboard, a mouse, a microphone and the like; an output unit 1107 formed by a display, a speaker and the like; a storage unit 1108 formed by a hard disk, a non-volatile memory and the like; a communication unit 1109 formed by a network interface card (such as a local area network (LAN) card, a modem and the like); and a drive 1110 for driving a removable medium 1111 such as a magnetic disk, an optical disk, a magneto-optical disk or a semiconductor memory.

In a computer having the above-described structure, the CPU 1101 loads the program stored in the storage unit 1108 to the RAM 1103 via the input/output interface 1105 and the bus 1104, and executes the program so as to perform the above-described processing.

The program to be executed by the computer (the CPU 1101) may be recorded on the removable medium 1111 as a package medium formed by, for example, a magnetic disk (including a floppy disk), an optical disk (including a compact disk-read only memory (CD-ROM)), a digital video disk (DVD) and the like), a mango-optical disk or a semiconductor memory. Furthermore, the program to be executed by the computer (the CPU 1101) may also be provided by a wired or wireless transmission medium such as a local area network, Internet or digital satellite broadcasting.

The program may be installed in the storage unit 1108 via the input/output interface 1105 in a case that the removable medium 1111 is mounted in the drive 1110. In addition, the program may be received by the communication unit 1109 via wired or wireless transmission medium, and is installed in the storage unit 1108. Alternatively, the program may be installed in advance in the ROM 1102 or the storage unit 1108.

The program to be executed by the computer may be executed according to the order described in the present specification, or may be executed in parallel or executed when necessary (such as when invoked).

The embodiments and technical effects of the present disclosure have been described in detail in conjunction with the accompanying drawings as above, but the scope of the present disclosure is not limited thereto. Those skilled in the art should understand that, various modifications and variations can be made on the embodiments discussed herein without departing from the principle and spirit of the present disclosure, depending on design requirements and other factors. The scope of the present disclosure is defined by the appended claims or the equivalents thereof.

Furthermore, the present disclosure may also be configured as follows.

According to an aspect of the present disclosure, it is provided a method for performing interference coordination in a communication system comprising a plurality of user terminals. The method includes: determining arrival angles of signals transmitted by the user terminals based on information obtained from the user terminals; and selecting the user terminals to be served based on the arrival angles of the signals of the user terminals.

The method further includes: receiving spread signals from at least one user terminal within a coverage of a base station, where the at least one user terminal includes served terminals served by the base station and interference terminals served by a neighboring base station; determining whether each of the received spread signals comes from the served terminal or the interference terminal based on a result of de-spreading the received spread signal; and determining the arrival angle of the signal of each of the at least one user terminals using the received spread signal.

Each of the served terminals and the interference terminals spreads a part of data to be transmitted therefrom using one of spreading codes which are orthogonal to one another and transmits the spread signals. The part of data to be transmitted by the terminal is the first L symbols of the data to be transmitted by the terminal. L is greater than or equal to 50.

Each of the served terminals and the interference terminals spreads sounding reference signal generated therefrom using a spreading code, and transmits the spread signal. The served terminals use the same spreading code, and the sounding reference signals generated by the served terminals are orthogonal to one another. The spreading code used by the served terminals is orthogonal to the spreading codes used by the interference terminals.

According to another aspect of the present disclosure, it is provided a method for receiving a signal in an uplink on base station side, which includes: determining the arrival angle of the signal of each of the served terminals and the interference terminals; initially restoring, in a smart antenna layer, the signal of the served terminal based on the arrival angle of the signal of the served terminal; and further restoring, in a multiple-input multiple-output (MIMO) layer, the signal of the served terminal based on the initially restored signal.

The method further includes: determining reception weight vector for the served terminal based on the arrival angle of the signal of the served terminal, and obtaining the initially restored signal of the served terminal using the reception weight vector.

The method further includes: determining a covariance matrix of signals transmitted by the interference terminals and noise; forming uplink steering vector for the served terminal by the determined arrival angle of the signal of the served terminal; and determine the reception weight vector for the served terminal using the determined covariance matrix and the formed uplink steering vector.

The method further includes: generating an equivalent MIMO channel in the smart antenna layer; and performing, in the MIMO layer, noise whitening process on the equivalent MIMO channel and whitening the initially restored signal.

The method further includes: restoring the signal of the served terminal from the initially restored signal based on zero-forcing algorithm or minimum-mean-square-error algorithm.

According to another aspect of the present disclosure, it is provided a method for transmitting a signal in a downlink on base station side, which includes: determining the arrival angle of the signal of each of the served terminals and the interference terminals; determining transmission weight vector for the served terminal based on the determined arrival angle of the signal of the served terminal; and transmitting a signal for the served terminal by weighting the signal for the served terminal by the determined transmission weight vector.

The method further includes: determining a covariance matrix of signals transmitted from the base station to the interference terminals; forming downlink steering vector for the served terminal based on the determined arrival angle of the signal of the served terminal; and determining the transmission weight vector for the served terminal using the determined covariance matrix and the formed downlink steering vector.

The method further includes: obtaining, by the base station, a precoding matrix based on channel large-scale fading coefficient fed back from the served terminal and the transmission weight vector for the served terminal, where the channel large-scale fading coefficient is estimated by the served terminal based on a pilot transmitted from the base station; and transmitting, by the base station, the signal for the served terminal by weighting the signal for the served terminal by the precoding matrix.

According to another aspect of the present disclosure, it is provided a base station in a communication system which comprises a plurality of user terminals, the base station comprising one or more processors configured to: determine arrival angles of signals transmitted by the user terminals based on information obtained from the user terminals; and select the user terminals to be served based on the arrival angles of the signals of the user terminals.

The one or more processors are further configured to: de-spread signals from at least one user terminal within a coverage of the base station, where the at least one user terminal includes served terminals served by the base station and interference terminals served by a neighboring base station; determine whether each of the spread signals comes from the served terminal or the interference terminal based on a result of the de-spreading; and determine the arrival angle of the signal of each of the at least one user terminal using the spread signal.

The spread signals is generated by each of the served terminals and the interference terminals by spreading a part of data to be transmitted therefrom using one of spreading codes which are orthogonal to each other. The part of data to be transmitted by the terminal is the first L symbols of the data to be transmitted by the terminal. L is greater than or equal to 50.

The spread signal is generated by each of the served terminals and the interference terminals by spreading sounding reference signal generated therefrom using a spreading code. The served terminals use the same spreading code, and the sounding reference signals generated by the served terminals are orthogonal to one another. The spreading code used by the served terminals is orthogonal to the spreading codes used by the interference terminals.

The one or more processors are further configured to: initially restore, in a smart antenna layer, the signal of the served terminal based on the arrival angle of the signal of the served terminal; and further restore, in a multiple-input multiple-output (MIMO) layer, the signal of the served terminal based on the initially restored signal.

The one or more processors are further configured to: determine reception weight vector for the served terminal based on the arrival angle of the signal of the served terminal, and obtain the initially restored signal of the served terminal using the reception weight vector.

The one or more processors are further configured to: determine a covariance matrix of signals transmitted from the interference terminals and noise; form uplink steering vector for the served terminal by the determined arrival angle of the signal of the served terminal; and determine the reception weight vector for the served terminal using the determined covariance matrix and the formed uplink steering vector.

The one or more processors are further configured to: generate an equivalent MIMO channel in the smart antenna layer; and perform, in the MIMO layer, noise whitening process on the equivalent MIMO channel and whiten the initially restored signal.

The one or more processors are further configured to: restore the signal of the served terminal from the initially restored signal based on zero-forcing algorithm or minimum-mean-square-error algorithm.

The one or more processors are further configured to: determine transmission weight vector for the served terminal based on the determined arrival angle of the signal of the served terminal; and weight a signal for the served terminal using the determined transmission weight vector.

The one or more processors are further configured to: determine a covariance matrix of signals transmitted from the base station to the interference terminals; form downlink steering vector for the served terminal by the determined arrival angle of the signal of the served terminal; and determine the transmission weight vector for the served terminal using the determined covariance matrix and the formed downlink steering vector.

The one or more processors are further configured to: obtain a precoding matrix based on channel large-scale fading coefficient from the served terminal and the transmission weight vector for the served terminal, and weight the signal for the served terminal by the precoding matrix, where the channel large-scale fading coefficient is estimated by the served terminal based on a pilot transmitted from the base station.

According to another aspect of the present disclosure, it is provided a base station in a communication system, which includes: a reception unit configured to receive spread signals from at least one user terminal within a coverage of the base station, where the at least one user terminal includes served terminals served by the base station and interference terminals served by a neighboring base station; a determination unit configured to determine whether each of the received spread signals comes from the served terminal or the interference terminal based on a result of de-spreading the received spread signal; and an arrival angle calculation unit configured to determine the arrival angle of the signal of each of the at least one user terminal using the received spread signal.

The spread signal is generated by each of the served terminals and the interference terminals by spreading a part of data to be transmitted therefrom using one of spreading codes which are orthogonal to one another. The part of data to be transmitted by the terminal is the first L symbols of the data to be transmitted by the terminal. L is greater than or equal to 50.

The spread signal is generated by each of the served terminals and the interference terminals by spreading sounding reference signal generated therefrom using a spreading code. The served terminals use the same spreading code, and the sounding reference signals generated by the served terminals are orthogonal to one another. The spreading code used by the served terminals is orthogonal to the spreading codes used by the interference terminals.

The base station further includes: a smart antenna layer processing unit configured to calculate reception weight vector for the served terminal based on the calculated arrival angle of the signal of the served terminal, and obtain the initially restored signal of the served terminal using the reception weight vector; and a multiple-input multiple-output (MIMO) layer processing unit configured to further restore the signal of the served terminal based on the initially restored signal.

The smart antenna layer processing unit calculates a covariance matrix of signals transmitted by the interference terminals and noise, forms uplink steering vector for the served terminal based on the determined arrival angle of the signal of the served terminal; and calculates the reception weight vector for the served terminal using the calculated covariance matrix and the formed uplink steering vector.

The MIMO layer processing unit restores the signal of the served terminal from the initially restored signal based on zero-forcing algorithm or minimum-mean-square-error algorithm.

The base station further includes: a transmission weight vector calculation unit configured to calculate transmission weight vector for the served terminal based on the calculated arrival angle of the served terminal; a weighting unit configured to weight a signal for the served terminal by the calculated transmission weight vector; and a transmission unit configured to transmit the weighted signal to the served terminal.

The transmission weight vector calculation unit calculates a covariance matrix of signals transmitted from the base station to the interference terminals; forms downlink steering vector for the served terminal based on the calculated arrival angle of the signal of the served terminal; and calculates the transmission weight vector for the served terminal using the calculated covariance matrix and the formed downlink steering vector.

The weighting unit obtains a precoding matrix based on channel large-scale fading coefficient received from the served terminal and the transmission weight vector for the served terminal, and weight the signal for the served terminal using the precoding matrix, wherein the channel large-scale fading coefficient is estimated by the served terminal based on a pilot transmitted from the base station.

The invention claimed is:

1. A method for performing interference coordination in a communication system comprising a plurality of user terminals, the method comprising:
   determining arrival angles of signals transmitted by the user terminals based on information obtained from the user terminals; and
   selecting the user terminals to be served based on the arrival angles of the signals of the user terminals, wherein the step of determining arrival angles of signals transmitted by the user terminals based on the information obtained from the user terminals further comprises:
   receiving spread signals from at least one user terminal within a coverage of a base station, wherein the at least one user terminal comprises served terminals served by the base station and interference terminals served by a neighboring base station;
   determining whether each of the received spread signals conies from the served terminal or the interference terminal based on a result of de-spreading the received spread signal; and
   determining the arrival angle of the signal of each of the at least one user terminal using the received spread signal.

2. The method according to claim 1, wherein each of the served terminals and the interference terminals spreads a part of data to be transmitted therefrom using one of spreading codes which are orthogonal to one another, and transmits, the spread signal.

3. The method according to claim 1, wherein each of the served terminals and the interference terminals spreads sounding reference signal generated therefrom using a spreading code, and transmits the spread signal.

4. The method according to claim 3, wherein the served terminals use the same spreading code, and the sounding reference signals generated by the served terminals are orthogonal to one another,
   wherein the spreading code used by the served terminals is orthogonal to the spreading codes used by the interference terminals.

5. A base station in a communication system which comprises a plurality of user terminals, the base station comprising one or more processors configured to:
   determine arrival angles of signals transmitted by the user terminals based on information obtained from the user terminals, including
   receive spread signals from at least one user terminal within a coverage of the base station, wherein the at least one user terminal comprises served terminals served by the base station and interference terminals served by a neighboring base station;
   determine whether each of the received spread signals comes from the served terminal or the interference terminal based on a result of de-spreading the received spread signal, and
   determine the arrival angle of the signal of each of the at least one user terminal using the received spread signal; and
   select the user terminals to be served based on the arrival angles of the signals of the user terminals.

6. The base station according to claim 5, wherein the one or more processors are further configured to:
   de-spread spread signals from at least one user terminal within a coverage of the base station, wherein the at least one user terminal comprises served terminals served by the base station and interference terminals served by a neighboring base station;
   determine whether each of the spread signals comes from the served terminal or the interference terminal based on a result of the de-spreading; and
   determine the arrival angle of the signal of each of the at least one user terminal using the spread signal.

7. The base station according to claim 6, wherein the spread signal is generated by each of the served terminals and the interference terminals by spreading a part of data to be transmitted therefrom using one of spreading codes which are orthogonal to one another.

8. The base station according to claim 6, wherein the spread signal is generated by each of the served terminals and the interference terminals by spreading sounding reference signal generated therefrom using a spreading code.

9. The base station according to claim 8, wherein the served terminals use the same spreading code, and the sounding reference signals generated by the served terminals are orthogonal to one another.

10. The method according to claim 9, wherein the spreading code used by the served terminals is orthogonal to the spreading codes used by the interference terminals.

11. The base station according to claim 6, wherein the one or more processors are further configured to:
    initially restore, in a smart antenna layer, the signal of the served terminal based on the arrival angle of the signal of the served terminal; and
    further restore, in a multiple-input multiple-output (MIMO) layer, the signal of the served terminal based on the initially restored signal.

12. The base station according to claim 11, wherein the one or more processors are further configured to:
    determine reception weight vector for the served terminal based on the arrival angle of the signal of the served terminal, and
    obtain the initially restored signal of the served terminal using the reception weight vector.

13. The base station according to claim 12, wherein the one or more processors are further configured to:
    determine a covariance matrix of signals transmitted from the interference terminals and noise;
    form uplink steering vector for the served terminal by the determined arrival angle of the signal of the served terminal; and
    determine the reception weight vector for the served terminal using the determined covariance matrix and the formed uplink steering vector.

14. The base station according to claim 11, wherein the one or more processors are further configured to:
    generate an equivalent MIMO channel in the smart antenna layer; and
    perform, in the MIMO layer, noise whitening process on the equivalent MIMO channel, and whiten the initially restored signal.

15. The base station according to claim 11, wherein the one or more processors are further configured to: restore the signal of the served terminal from the initially restored signal based on zero-forcing algorithm or minimum-mean-square-error algorithm.

16. The base station according to claim 6, wherein the one or more processors are further configured to:
    determine transmission weight vector for the served terminal based on the determined arrival angle of the signal of the served terminal; and
    weight a signal for the served terminal by the determined transmission weight vector.

17. The base station according to claim 16, wherein the one or more processors are further configured to:
- determine a covariance matrix of signals transmitted from the base station to the interference terminals;
- form downlink steering vector for the served terminal by the determined arrival angle of the signal of the served terminal; and
- determine the transmission weight vector for the served terminal using the determined covariance matrix and the formed downlink steering vector.

18. The base station according to claim 16, wherein the one or more processors are further configured to:
- obtain a precoding matrix based on channel large-scale fading coefficient from the served terminal and the transmission weight vector for the served terminal, and
- weight the signal for the served terminal by the precoding matrix,
- wherein the channel large-scale fading coefficient is estimated by the served terminal based on n pilot transmitted from the base station.

* * * * *